J. C. LINCOLN.
PROCESS OF CURING MEAT.
APPLICATION FILED MAY 4, 1907.

930,772.

Patented Aug. 10, 1909.

WITNESSES:
Brennan B. West.
Nathan F. Fretter.

INVENTOR,
John C. Lincoln.
By Bates, Fouts & Hull
ATTYS.

UNITED STATES PATENT OFFICE.

JOHN C. LINCOLN, OF CLEVELAND, OHIO, ASSIGNOR, BY MESNE ASSIGNMENTS, TO THE ELECTRIC MEAT CURING COMPANY, OF CLEVELAND, OHIO, A CORPORATION OF MAINE.

PROCESS OF CURING MEAT.

No. 930,772.     Specification of Letters Patent.     Patented Aug. 10, 1909.

Application filed May 4, 1907. Serial No. 371,795.

*To all whom it may concern:*

Be it known that I, JOHN C. LINCOLN, a citizen of the United States, residing at Cleveland, in the county of Cuyahoga and State of Ohio, have invented a certain new and useful Improvement in Processes of Curing Meat, of which the following is a full, clear, and exact description, reference being had to the accompanying drawings.

This invention relates to a process of curing meat with the aid of a current of electricity.

One of the objects of the present invention is to do away with the chlorin gas ordinarily resulting from the action of electricity on brine.

Another object is to render the process more efficient and continuous, the brine being properly cooled so that it may be circulated through the curing tank continuously.

My process, in the preferred form includes the use of an alternating current which causes such reactions at the electrodes that the chlorin immediately enters into combination instead of being given off as a gas, and by continuously cooling the brine outside of the curing tank, I am enabled to overcome any harmful heating by the current and to provide a continuous circulation at proper temperature around the meat.

In carrying out this process I have devised certain apparatus, hereinafter more fully described.

The drawings show the apparatus and thereby illustrate the process.

Figure 1:
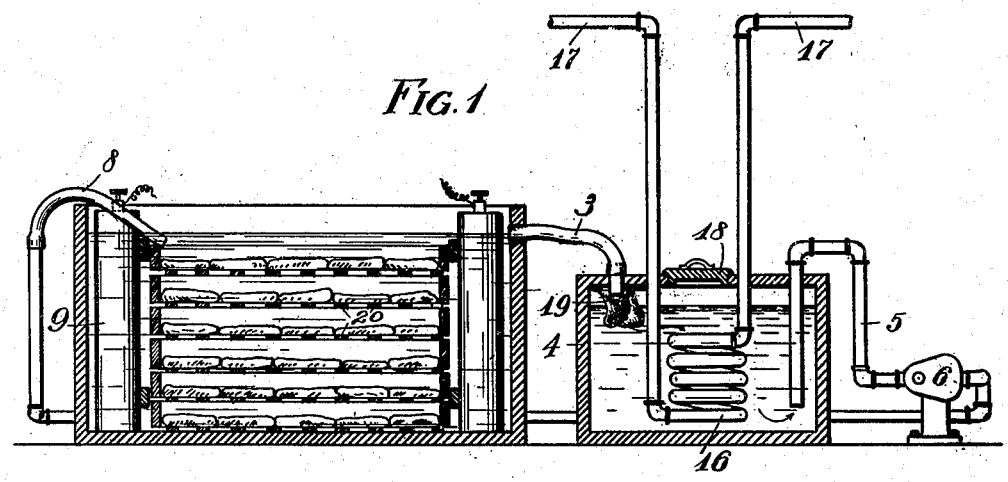
Figure 2:
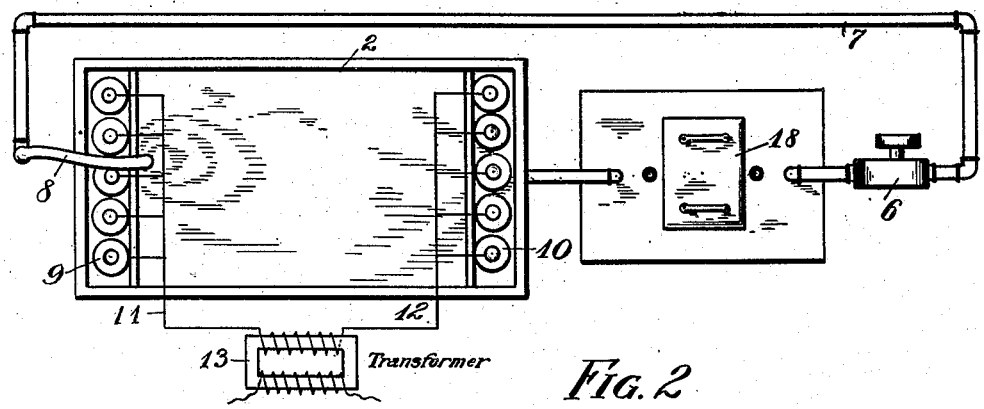

Figure 1 is a vertical section through the curing and cooling tanks of the apparatus and Fig. 2 is a plan of the apparatus.

As shown in the drawings, 1 represents a curing tank adapted to contain meat 2, which is separated by suitable frames or slattings 20. This tank has a rubber overflow pipe 3 which is adapted to discharge into a tank 4 and from this latter tank near its bottom leads a pipe 5 to a pump 6. From this pump a pipe 7 leads to the other end of the tank 1 and discharges into that tank through a rubber hose 8. This enables the brine to be circulated continuously, which is one of the essential steps in my method.

Contained in the tank 1 near its opposite ends are porous cups arranged in two sets 9 and 10, as shown. The cups contain electrodes, all the electrodes in each set of cups being connected in parallel. Thus the electrodes in the cups 9 are connected with the conductor 11 and those in the cups 10 with the conductor 12. These conductors lead to the terminals of a suitable source of alternating current, as a transformer or a generator 13. During the curing, this generator is caused to pass an alternate current from either set of electrodes to the other through the meat. The electric current increases the rapidity of curing to a very great degree.

Heretofore in the electric curing of meat a direct current has been used, which has the disadvantage of liberating chlorin at the positive electrodes. With an alternating current, however, this is obviated, for as soon as the current decomposes the salt into sodium and chlorin, the sodium reacts on the water to produce sodium hydrate and this hydrate and chlorin react to produce chlorates and chlorites without liberating free chlorin. This is of great importance, for it has heretofore been troublesome to take care of the chlorin gas. The allowable variation in current strength through the meat is not great, and the proper amperage can be much easier obtained with an alternating current derived from a properly selected transformer. Moreover, the alternating current produces a very regular and even action on the meat. For all of these reasons it is preferable to use an alternating current. The process may be carried out, however, by using a direct current, which operates efficiently with my system of circulating the brine and circulating it outside of the main tank. The porous cups 9, which are preferably used with the alternating current to hold the sediment from the disintegrating electrodes, become of further value with a direct current in preventing the chlorin gas passing into the meat.

To prevent the circulating pipes from short circuiting the current, I provide the rubber connections 3 and 8 referred to, which interrupt any electric conductor by way of such pipes.

As the current heats the brine, I provide means for cooling it so that it may be used continuously. In order to cool the brine quickly enough to allow the proper circulation, the cooling means must have a considerable area exposed to the brine and must be metallic to be a proper heat conductor. To enable such cooling means to act properly on the brine without being subjected to electrolysis by the current or interfering with the curing tank itself, I provide the extra tank 4 described and I cool the brine in this tank by means of a coil 16 of pipe from a cooling system, which is indicated by the pipes 17. This system may have compressed ammonia or other cooling medium. It serves to lower the temperature of the brine while passing through this tank sufficiently to prevent its rising above the desirable maximum during curing.

As there is considerable frothing of the brine in the tank 4, I close its top providing it with a cover 18, and I provide a suitable strainer 19 over the mouth of the pipe 3 to catch any particles of meat carried over from the curing tank.

I found that my apparatus operates very efficiently with a strong brine, say, of about 82%, with temperature maintained between 33 degrees and 38 degrees F., and with a current of between 34 and 38 amperes. With such current and temperature and the brine continuously circulated, I am enabled to produce well-nigh perfect results in curing meat.

Having thus described my invention, I claim:

1. The process of curing meat consisting of circulating brine through a tank containing the meat, cooling the brine in a tank outside of the curing tank, and passing an electric current through the meat and brine during such curing.
2. The process of curing meat consisting of circulating brine through a tank containing the meat, cooling such brine outside of the tank during its circulation by means which do not dilute the brine, and passing an electric current through the meat and brine during such curing, while protecting by porous members the contents of the tank from contamination at the electrodes.

3. The process of curing meat which consists in circulating brine about the meat, cooling the brine in a tank outside of the curing tank and passing an alternating current through the brine and meat.

4. The process of curing meat consisting of immersing the same in a tank containing brine, circulating the brine through the tank, cooling the brine outside of the tank during its circulation by means which do not dilute the brine, and passing an alternating current through the meat and brine during such curing while protecting the contents of the tank from contamination at the electrodes by the interposition of porous members.

5. The process of curing meat consisting of circulating brine through a tank containing the meat, cooling such brine outside of the tank during its circulation by means which do not dilute the brine, and passing an electric current through the meat and brine during such curing.

In testimony whereof, I hereunto affix my signature in the presence of two witnesses.

JOHN C. LINCOLN.

Witnesses:
ALBERT H. BATES,
S. E. FOUTS.